Patented Feb. 4, 1947

2,415,235

UNITED STATES PATENT OFFICE 2,415,235

AMINO-ALCOHOL ESTERS OF ARALKYL-OXY-BENZOIC ACIDS

Walter G. Christiansen, Glen Ridge, and Sidney E. Harris, Nutley, N. J., assignors to E. R. Squibb & Sons, New York, N. Y., a corporation of New York No Drawing. Original application September 9, 1937, Serial No. 163,034. Divided and this application June 28, 1944, Serial No. 542,621

3 Claims. (Cl. 260—473)

This application is a division of our application Serial No. 163,034, filed September 9, 1937.

This invention relates to, and has for its object the provision of, certain amino-alcohol esters of oxy-benzoic acids, and acid-addition salts thereof. These esters have the general formula

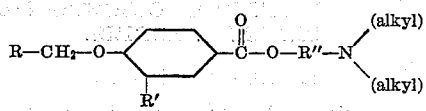

wherein R represents a member of the group consisting of aromatic and araliphatic radicals, R' represents a member of the group consisting of hydrogen and alkyl, and R" represents a divalent radical providing a continuous carbon bridge, preferably an alkylene radical.

The compounds of this invention are valuable therapeutic agents, being particularly effective for inducing local anesthesia.

In the practice of this invention, an aracyl halide of the general formula

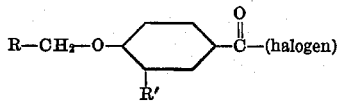

wherein R and R' have the above-noted signification, is reacted with an alcohol of the formula

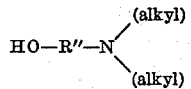

wherein R" has the above-designated meaning, to produce the desired ester. However, other methods hereinafter described may be employed to produce the compounds of the present invention.

The amino-esters of this invention are generally recovered in the form of their addition-salts with hydrochloric acid. However, other acids forming addition-salts with amines may be used in place of hydrochloric; such acids are boric, nitric, lactic, tartaric, citric, phosphoric, sulfuric, picric, and picrolonic. The addition salts may be converted into the free bases in the usual manner.

The following examples are illustrative of the invention:

EXAMPLE 1

*Gamma-dimethylamino-n-propyl ester of p-(β-phenyl-ethoxy) benzoic acid (hydrochloride)*

To 15.2 g. of methyl p-hydroxy-benzoate dissolved in a solution of 2.5 g. of metallic sodium in 90 cc. of absolute alcohol, is added 20.5 g. of β-phenyl-ethyl bromide, and the mixture is refluxed 7 hours. Filtering off the inorganic salts, distilling off the alcohol from the filtrate, hydrolyzing the residue by boiling it with aqueous alkali, precipitating the free acid with hydrogen chloride, filtering, washing and drying, yields the intermediate, p-(β-phenyl-ethoxy)-benzoic acid, in the form of a white powder, melting at 163–164° C. Dissolving 10 g. of this intermediate compound in 40 cc. of phosphorus oxychloride, adding 8.6 g. of phosphorus pentachloride, warming the mixture on a steam bath, evaporating off the excess phosphorus oxychloride, and vacuum-distilling the residue, yields the acid chloride of the intermediate, having a boiling point (with slight decomposition) of 215–230° C./5 mm.

1.55 g. gamma-dimethylamino-propanol and 4.0 g. p-(β-phenyl-ethoxy)-benzoyl chloride are dissolved in chloroform and the solution is refluxed for a few minutes. Dry ether is added until a faint precipitate appears, and the whole is allowed to stand for some time. The crystalline precipitate formed is filtered off and washed with dry ether; it melts at 156.5–157.5° C. (corrected).

EXAMPLE 2

*β-diethylamino-ethyl ester of p-(p'-nitro-benzyloxy) benzoic acid (hydrochloride)*

5.5 g. p-nitro-benzyl bromide is added to a solution of 6.4 g. β-diethylamino-ethyl ester of p-hydroxybenzoic acid in 50 cc. dry acetone in which 15 g. anhydrous potassium carbonate is suspended. The mixture is refluxed for 12 hours, filtered, and the acetone distilled from the filtrate. The residue is treated with a solution of hydrogen chloride in alcohol and some acetone added. Then ether is added, and the product precipitates as the hydrochloride. It is purified by recrystallization from acetone and ether; it melts at 145–146° C. (corrected).

EXAMPLE 3

*β-diethylamino-ethyl ester of p-(p'-amino-benzyloxy)-benzoic acid (mono-hydrochloride)*

5 g. β-diethylamino-ethyl ester of p-(p'-nitrobenzyloxy)-benzoic acid hydrochloride is dissolved in absolute alcohol and shaken with hydrogen gas in the presence of Adams platinum oxide catalyst (Org. Syn., Col. vol. page 452), until no more hydrogen is absorbed. The catalyst is then removed by filtration and dry ether added to precipitate the hydrochloride; on recrystallizing by dissolving in absolute alcohol and adding dry ether, a product melting at 185–187° C. (corrected) is obtained.

The following are among the many other compounds embraced by the present invention, and may be prepared according to the directions given above:

4. β-Diethylamino-ethyl ester of p-(β-phenyl-ethoxy) benzoic acid.
5. α,α-Di(dimethylaminomethyl)-amyl ester of p-(β-phenyl-ethoxy)-benzoic acid.
6. α-Methyl-α-dimethylaminomethyl-gamma-phenyl-n-propyl ester of p-(β-phenyl-ethoxy)-benzoic acid.
7. Gamma-dimethylamino-n-propyl ester of 3-methyl-4-(β-phenyl-ethoxy)-benzoic acid.
8. α-Methyl-α-dimethylaminomethyl-n-amyl ester of 3-methyl-4-(β-phenyl-ethoxy)-benzoic acid.
9. α-Methyl-α-dimethylaminomethyl-gamma-phenyl-n-propyl ester of 3-methyl-4-(β-phenyl-ethoxy)-benzoic acid.
10. α-Methyl-α-dimethylaminomethyl-n-amyl ester of p-(β-phenyl-ethoxy)-benzoic acid.
11. α,α-di(dimethylaminomethyl)-gamma-phenyl-n-propyl ester of 3-methyl-4-(β-phenyl-ethoxy)-benzoic acid.
12. α,α-Di(dimethylaminomethyl)-n-amyl ester of 3-methyl-4-(β-phenyl-ethoxy)-benzoic acid.

EXAMPLE 13

The intermediate 3-methyl-4-(β-phenyl-ethoxy)-benzoyl chloride used in the preparation of the compounds of Examples 7, 8, 9, 11 and 12 may be prepared as follows:

23 g. of the ethyl ester of 3-methyl-4-hydroxy-benzoic acid, 3.2 g. sodium and 23 g. of β-phenyl-ethyl bromide are reacted together in 200 cc. absolute alcohol in the manner described in Example 1. The product 3-methyl-4-(β-phenyl-ethoxy)-benzoic acid melts at 150–152° C. (corrected).

13 g. of this acid reacted with 10.5 g. phosphorus pentachloride in the manner described in Example 1 gives the corresponding acid chloride boiling at 210–215° C. at 1.0 mm.

The invention may be variously otherwise embodied, within the scope of the appended claims.

We claim:

1. The hydrochloride of gamma-dimethyl-amino-n-propyl-p-(β-phenyl-ethoxy)-benzoate.
2. β-Diethylamino-ethyl ester of p-(β-phenyl-ethoxy)-benzoic acid.
3. A compound of the group consisting of: amino-esters of the general formula

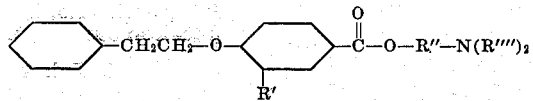

wherein R' represents a member of the group consisting of hydrogen and methyl, R'' represents a divalent alkyl residue with 2 to 3 carbon atoms, and R'''' represents an alkyl residue with 1 to 2 carbon atoms; and acid-addition salts thereof.

WALTER G. CHRISTIANSEN.
SIDNEY E. HARRIS.

REFERENCES CITED

The following references are of record in the file of this patent:

UNITED STATES PATENTS

| Number | Name | Date |
|---|---|---|
| 2,103,266 | Lott | Dec. 28, 1937 |
| 1,193,650 | Wildman | Aug. 8, 1916 |

OTHER REFERENCES

Rohmann et. al. "Archiv der Pharmazie," vol. 274 (1936), pgs. 110–126.